United States Patent Office 3,248,162
Patented Apr. 26, 1966

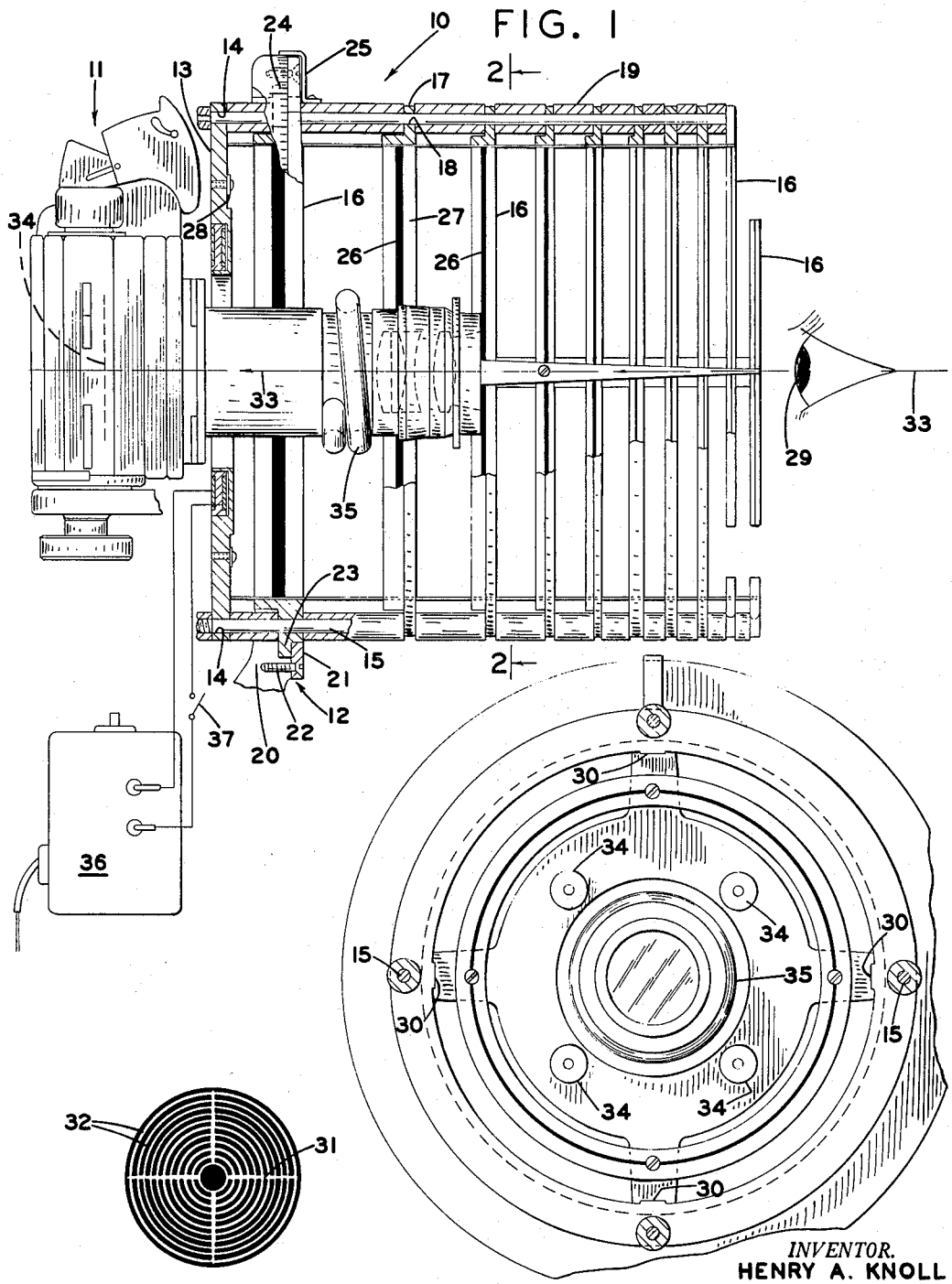

3,248,162
PHOTOKERATOSCOPE WITH REFLECTING RINGS IN CYLINDRICAL CAGE STRUCTURE
Henry A. Knoll, Penfield, N.Y., assignor to Bausch & Lomb Incorporated, Rochester, N.Y., a corporation of New York
Continuation of application Ser. No. 177,772, Mar. 6, 1962. This application Sept. 28, 1964, Ser. No. 402,984
1 Claim. (Cl. 351—6)

This invention relates to ophthalmic instruments and more particularly to a photokeratoscope for photographing the contour of a subject's cornea.

This is a continuation of my application Serial No. 177,772, filed March 6, 1962, now abandoned.

With the relatively recent advent of plastic contact lenses and the problems involved in fitting such lenses, it has become more widely known that the cornea of the human eye is not a perfect sphere. In fact, it has been noted that the human cornea varies considerably from a spherical shape and this fact has had to be taken into account in fitting contact lenses to the cornea.

There have been prior suggestions for photokeratoscopes for photographing the contour of a human cornea but for one reason or another these prior photokeratoscopes have not been entirely satisfactory. The principal reason for this unsatisfactory operation of prior photokeratoscopes is that they have not always given an accurate representation of the contour of the full cornea.

The principle utilized in photokeratoscopy is that a plurality of reflecting rings are positioned in front of a subject's cornea and illuminated. The reflecting rings cause reflections of the rings to appear on the cornea and these reflections are then photographed. The reflecting rings are circular and deviations of the cornea from sphericity causes bumps or indentations to be present in the reflections of the rings which are photographed. The bumps or indentations indicate irregularities in the surface of the cornea. Unequally spaced rings indicate regular deviations from sphericity and elliptical reflections indicate a toric cornea, for example.

Prior photokeratoscopes have had the reflecting rings disposed in a variety of manners. Among these are photokeratoscopes wherein the rings are disposed on a plane surface which is held in front of the subject's cornea and illuminated by a light source behind and to one side of the cornea. Other photokeratoscopes have utilized the reflecting rings formed on the interior surface of a sphere with the light source outside of the sphere. A still further form of photokeratoscope has utilized the reflecting rings formed on the inner surface of a cylindrical member with the light source disposed outside of the cylindrical member. With all of these constructions drawbacks have been encountered, among which is the fact that only a relatively small portion of the cornea is encompassed by the reflected contour rings so that the contour of only the central portion of the cornea is represented.

The present invention has for a principal object the provision of an improved photokeratoscope wherein the reflecting rings are disposed on the interior surface of a cylindrical cage with the light source disposed within the cage itself. The subject's cornea is positioned adjacent one end of the cage and reflections of the rings substantially cover the area occupied by the subject's cornea. Thus, a more representative picture of the contour of the cornea may be obtained.

The present invention also contemplates the provision of longitudinally extending, internally facing reflecting members spaced radially around the cylindrical cage for the purpose of providing reflected guide marks on the subject's cornea. This facilitates an evaluation of the results obtained by the photokeratoscope.

The present photokeratoscope also includes mounting means for rotatably mounting the cylindrical cage for facilitating adjustment of the cage relative to the cornea. The mounting means comprises a dial and indicator device for indicating the position of the cage relative to the cornea being photographed.

The foregoing and other objects and advantages of the present invention become more apparent from the following detailed description when read in conjunction with the accompanying drawing, wherein:

FIG. 1 is a side elevational view shown partly in section and illustrating the principal features of the photokeratoscope comprising the subject matter of the present invention;

FIG. 2 is a sectional view taken substantially along the line 2—2 in FIG. 1 and looking in the direction of the arrows; and FIG. 3 is a representation of a picture of a perfect sphere taken by the camera used in the photokeratoscope.

With reference now to the drawings, wherein like reference numerals have been used in the different views to indentify identical parts, the photokeratoscope comprising the subject matter of the present invention comprises generally a cylindrical cage represented by reference numeral 10, a camera represented by reference numeral 11 and a mount for rotatably mounting the cage 10 and represented fragmentarily by reference numeral 12.

The cage 10 comprises a relatively flat annular disklike member 13 having a plurality of openings 14 around its periphery for the purpose of receiving four threaded pins 15. Mounted upon the pins 15 in stacked relation are a plurality of ring-like members 16. Each of the ring-like members is formed with a peripheral flange 17 through which are formed suitable apertures 18 and through which the pins 15 extend. Suitable spacer sleeves 19 are positioned between the rings 16 in order to maintain proper spacing of the rings 16 relative to each other.

The mounting member 12 comprises a ring-like member 20 with a ring-like plate 21 fixed thereto by screws 22 to form a groove for receiving a flange 23 on the outer periphery of the leftwardmost ring 16. By this means the cage 10 is rotatable relative to the mounting member 12 and, in order to provide an indication of the position of the cage 10 within the mounting member 12, guide marks 24 are formed on the outer periphery of the ring 20 and a pointer 25 is suitably fixed to the cage 10 so that upon rotation of the cage 10 the pointer 25 moves across the indicator marks 24.

Each of the ring-like members 16 is formed with a dark portion 26 and a light colored reflecting portion 27. A similar light colored reflecting ring 28 is suitably fixed to the inside of the disk-like member 13 in order to form what will provide the innermost concentric reflection on the cornea 29 of the patient whose eye is being photographed. Also, in order to facilitate positioning the cornea 29 close to the right-hand end of cage 10, the ring 16 which is furthest to the right is cut away for the reception of the patient's nose so that the outermost ring reflected from the cornea will not be a complete ring. Four longitudinally extending reflecting members which are light colored and represented by reference numeral 30 are positioned 90° apart on the interior of the cage 10 in order to form guide marks which are reflected from the cornea 29 as radial marks 31, shown in FIG. 3, the concentric contour rings being represented by lines 32 in FIG. 3.

In order to facilitate positioning the cornea 29 in proper position along the axis 33 of the cage 10, a plurality of modelling lights 34 are positioned on plate 13 in order to illuminate the interior of the cage structure 10.

The camera 11 is mounted in axial alignment on the cylinder axis 33 so that reflections 32 of the rings 16 form an image on an image plane 34 within the camera 11. An illuminating light comprising an annular or circular light source 35 is snugly disposed in concentric arrangement around the camera and to the rear of the front of the camera lens barrel for completely illuminating the inside of the circular cage structure to properly form reflections of the rings 16 on the cornea 29. The circular light source 35 being snugly disposed around the camera lens barrel is thereby prevented from directly illuminating the cornea 29.

A suitable source of electricity, represented by reference numeral 36, is provided for illuminating the modelling lights 34. The circuit for the modelling light 34 and the illuminating light 35 is such that upon manipulation of the circuit switch 37 the modelling lights 34 will be turned out and a suitable flash provided by light 35 to properly illuminate the rings 16 to form reflections 32 and 31 in the cornea 29.

It will be understood that by the use of the present photokeratoscope the contour rings 32 extend sufficiently outwardly to give an accurate representation of the contour of the cornea 29 over substantially the entire area of the cornea. The guide marks 31 enable comparison of one picture with others taken by the photokeratoscope of the same cornea. The pointer and indicator means 25 and 24 facilitate positioning the cage in the desired location relative to the cornea for successive pictures.

It is contemplated that changes and modifications may be made in the present invention without departing from the spirit and scope thereof.

What is claimed is:

A photokeratoscope for photographing the contour of a subject's cornea, said photokeratoscope comprising a substantially cylindrical cage structure including a plurality of annular internally facing reflecting rings each having a reflecting surface on the inner cylindrical wall thereof, said rings being progressively thicker and the spacing therebetween gradually increasing proceeding axially into said cage structure from the subject's cornea, said cage structure also including a plurality of longitudinally extending internally facing reflecting members, a substantially circular light source disposed wholly within said cage structure and illuminating said reflecting rings and said reflecting members whereby the reflecting rings and reflecting members respectively reflect patterns from their internal surfaces of generally concentric contour rings and radial guide marks onto a subject's cornea disposed at one end of said cage, and a camera disposed along the axis of said cage and having a lens barrel aligned with the subject's cornea for photographing said contour rings and guide marks on the subject's cornea, said circular light source being snugly disposed in annular relation around said camera lens barrel and rearwardly spaced from the front of the camera lens barrel to prevent direct light rays from reaching the subject's cornea.

References Cited by the Examiner

UNITED STATES PATENTS 2,947,216  8/1960  Drews _____ 351—7

OTHER REFERENCES

Dekking: "Photographic Investigation of The Eye," article in Journal of the Biological Photographic Association, vols. 3–4, March 1935, pp. 88–95 cited.

DAVID H. RUBIN, *Primary Examiner.*